United States Patent [19]

Hauenstein et al.

[11] Patent Number: 5,789,473
[45] Date of Patent: Aug. 4, 1998

[54] POLYOLEFIN COMPOSITION CONTAINING DIORGANOPOLYSILOXANE PROCESS AID

[75] Inventors: Dale Earl Hauenstein; David Joseph Romenesko, both of Midland, Mich.

[73] Assignee: Dow Corning Corporation, Midland, Mich.

[21] Appl. No.: 404,739

[22] Filed: Jan. 24, 1995

[51] Int. Cl.$^6$ .................................................. C08J 5/32
[52] U.S. Cl. ...................... 524/265; 524/269; 428/500; 428/516
[58] Field of Search ...................... 524/269, 265; 428/516, 500

[56] References Cited

U.S. PATENT DOCUMENTS

| | | | |
|---|---|---|---|
| 2,930,083 | 3/1960 | Vostovich | 18/55 |
| 4,265,801 | 5/1981 | Moody | 260/40 R |
| 4,535,113 | 8/1985 | Foster | 524/262 |
| 4,666,772 | 5/1987 | Schinkel | 428/330 |
| 4,692,386 | 9/1987 | Schinkel | 428/515 |
| 4,857,593 | 8/1989 | Leung | 525/92 |
| 4,978,436 | 12/1990 | Kelly | 204/165 |
| 5,034,278 | 7/1991 | Turbett | 428/450 |
| 5,356,585 | 10/1994 | Romenesko | 264/211 |

FOREIGN PATENT DOCUMENTS

| | | |
|---|---|---|
| 1049682 | 1/1975 | Canada . |
| 600166A1 | 5/1993 | European Pat. Off. . |
| 3203123 | 12/1989 | Japan . |
| 4089850 | 8/1990 | Japan . |
| 5098090 | 11/1991 | Japan . |
| 1062241A | 7/1982 | U.S.S.R. . |

*Primary Examiner*—Peter D. Mulcahy
*Attorney, Agent, or Firm*—Alex Weitz

[57] ABSTRACT

There is disclosed a polyolefin composition which can be extruded at relatively high rates to provide extrudate having a low surface roughness (sharkskin), said composition comprising (A) 100 parts by weight of a polyolefin resin; and (B) 0.01 to 1 part by weight of a hydroxy-functional diorganopolysiloxane process aid, said diorganopolysiloxane having a number average molecular weight of at least 10,000. In particularly preferred embodiments, a hydroxy-functional diorganopolysiloxane in combination with a low density polyethylene is used as a process aid for linear low density polyethylene.

28 Claims, No Drawings

POLYOLEFIN COMPOSITION CONTAINING DIORGANOPOLYSILOXANE PROCESS AID

FIELD OF THE INVENTION

The present invention relates to polyolefin compositions. More particularly, the invention relates to compositions wherein a hydroxy-functional diorganopolysiloxane is added to a polyolefin, said compositions having improved processing characteristics, particularly with respect to a surface defect phenomenon known in the art as melt fracture or "sharkskin."

BACKGROUND OF THE INVENTION

When a high molecular weight thermoplastic resin is extruded through a die, smooth extrudates can only be obtained up to a certain shear stress (i.e., shear rate; extruder output rate). Beyond that, surface irregularities begin to appear. Irregularities such as haze and surface roughness, known in the art as melt fracture or "sharkskin," limit the production rates in commercial applications. To counteract these undesirable phenomena, and thereby achieve higher output rates, process aids are typically added to the thermoplastic resin prior to extrusion. One of the primary functions of a process aid is to delay, suppress, or eliminate, the onset of surface flow defects such as haze and sharkskin, and to enable operation at higher shear stress.

Thus, certain fluoroelastomers have been found to delay the onset of melt fracture and the above mentioned surface defects in thermoplastics such that higher shear rates and output can be attained while still producing acceptable extrudates. Such additives are typically employed at a level of about 250 to 3,000 parts per million of the fluoroelastomer (based on the weight of the thermoplastic) and they are generally added to the thermoplastic prior to extrusion by dry blending of fluoroelastomer concentrate therewith.

In the case of polyolefin resins, even the employ of the above described process aids falls short when it comes to the industry's appetite for ever increasing production rates. This quest for higher extrusion rates, which is driven primarily by economic considerations related to the efficient use of processing equipment and human resource, is of particular interest to producers of blown film.

SUMMARY OF THE INVENTION

It has now been found that, when a small quantity of a hydroxy-functional diorganopolysiloxane is added to a polyolefin, considerably higher extrusion rates than are possible with the fluoroelastomer process aids can be attained. Furthermore, the extrudate obtained has a reduced surface roughness (sharkskin) relative to the fluoroelastomer-containing systems.

The present invention therefore relates to a composition comprising:

(A) 100 parts by weight of a polyolefin resin; and
(B) 0.01 to 1 part by weight of a hydroxy-functional diorganopolysiloxane, said diorganopolysiloxane having a number average molecular weight of at least 10,000.

In particularly preferred embodiments, a linear low density polyethylene is modified with a combination of the hydroxy-functional diorganopolysiloxane and, additionally, a low density polyethylene. Such compositions exhibit a surprisingly low degree of sharkskin at relatively high extrusion speeds. Moreover, there is less "screw slip" associated with these three-component systems relative to the two-component systems of the invention, as described infra.

DETAILED DESCRIPTION OF THE INVENTION

The polyolefin (A) of the present invention may be selected from homopolymers of olefins as well as interpolymers of one or more olefins with each other and/or up to about 40 mole percent of one or more monomers which are copolymerizable with the olefins. Examples of suitable polyolefins include homopolymers of ethylene, propylene, butene-1, isobutylene, hexene, 1,4-methylpentene-1, pentene-1, octene-1, nonene-1 and decene-1, inter alia. Interpolymers of two or more of the above mentioned olefins may also be employed as component (A) and they may also be copolymerized with, e.g., vinyl or diene compounds or other such compounds which can be copolymerized with the olefins.

Specific examples of suitable interpolymers are ethylene-based copolymers, such as ethylene-propylene copolymers, ethylene-butene-1 copolymers, ethylene-hexene-1 copolymers, ethylene-octene-1 copolymers, ethylene-butene-1 copolymers and interpolymers of ethylene with two or more of the above mentioned olefins.

Component (A) may also be a blend of two or more of the above mentioned homopolymers or interpolymers. For example, the blend can be a uniform mixture of one of the above systems with one or more of the following: polypropylene, high pressure, low density polyethylene, high density polyethylene, polybutene-1 and polar monomer-containing olefin copolymers such as ethylene/acrylic acid copolymers, ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers and ethylene/acrylic acid/vinyl acetate terpolymers, inter alia.

Particularly preferred polyolefins (A) are polyethylene (PE) polymers such as low pressure, substantially linear, ethylene homopolymers and interpolymers of ethylene with alpha-olefins having 3 to 10 carbon atoms, such interpolymers being known as linear low density polyethylene (LLDPE) in the art. Preferably, these systems have a density of about 0.85 to 0.97 g/cc, more preferably 0.875 to 0.930 g/cc, and weight average molecular weight of about 60,000 to about 200,000.

The above interpolymers are well known in the art and further description thereof is considered unnecessary.

The diorganopolysiloxane (B) of the present invention is a hydroxy-functional oil or high consistency gum having a number average molecular weight (Mn) of at least about 10,000, but preferably below about 1,000,000. Preferably, the Mn of component (B) is about 40,000 to about 400,000, more preferably about 75,000 to about 400,000. When the molecular weight is below about 10,000 the compositions tend to exhibit excessive screw slip. Furthermore, at the lower molecular weights there is a marked decrease in extruder output when the compositions are extruded a second time. Such a second extrusion is often required in industrial operations. For example, errors in manufacture, such as incorrect extruder settings or omission of/insufficient amount of key ingredients, necessitate re-extrusion of the resulting "off-spec" material. Likewise, in film blowing operations, the edge portions of a flattened bubble are trimmed and recycled to the extruder. Further, re-extrusion is employed when scrap is returned and recycled, this procedure being known as "post-consumer recycle" in the art. On the other hand, when the molecular weight is above about 1,000,000, mixing the diorganopolysiloxane into the polyolefin becomes difficult but such a siloxane could still be employed.

Thus, in order to achieve a good balance with respect to sharkskin, screw slippage and extrusion efficiency of recycled material, it is preferred that component (B) is a gum having Mn in the approximate range of 100,000 to about 400,000 and most preferably about 250,000 to about 350,000.

Component (B) may be a linear or branched polymer or copolymer wherein the organic groups are independently selected from methyl or phenyl radicals. Suitable diorganopolysiloxanes include polydimethylsiloxane homopolymers, copolymers consisting essentially of dimethylsiloxane units and methylphenylsiloxane units, copolymers consisting essentially of dimethylsiloxane units and diphenylsiloxane units, copolymers consisting essentially of diphenylsiloxane units and methylphenylsiloxane units, and homopolymers of methylphenylsiloxane units. Mixtures of two or more such polymers or copolymers may be employed as component (B).

For the purposes of the present invention the diorganopolysiloxane (B) must contain at least 1 hydroxyl group in the molecule. The hydroxyl group or groups may be located at the ends of the molecule, they may be distributed along the chain or they may be located both at the ends as well as along the chain. Preferably, the hydroxyls reside at the molecular chain ends in the form of diorganohydroxysiloxy groups, such as dimethylhydroxysiloxy, diphenylhydroxysiloxy, and methylphenylhydroxysiloxy, inter alia. When the hydroxyls are located only along the chain, the terminal groups of the diorganopolysiloxane may be any non-reactive moiety, typically a triorganosiloxy species such as trimethylsiloxy.

It is preferred that the diorganopolysiloxane (B) is a linear polydimethylsiloxane containing up to about 50 mole percent of phenyl radicals. Most preferably, it is a polydimethylsiloxane homopolymer having dimethylhydroxysiloxy end groups.

Component (B) is well known in the art and many such polymers and copolymers are available commercially. However, in the usual commercial preparation of these polymers, a considerable amount of low molecular weight cyclic polysiloxane species is formed. For the purposes herein, it is preferred that these cyclics be removed (e.g., by stripping at elevated temperatures and/or reduced pressure) since they generally impart undesirable characteristics to the instant compositions and/or process. For example, the presence of cyclics can degrade the surface quality of the extrudate, generate foaming and/or smoke or it can increase the amount of screw slippage during extrusion.

The compositions of the present invention are prepared by thoroughly dispersing from about 0.01 to 1 part by weight (100 to 10,000 parts per million) of diorganopolysiloxane (B) in 100 parts by weight of a polyolefin (A). It is preferred that about 0.02 to 0.5 part by weight (200 to 5,000 ppm) of component (B) is used for each 100 parts by weight of component (A). More preferably, about 0.03 to 0.2 part of (B), and most preferably about 0.04 to 0.2 part, per 100 parts by weight of (A) are used. When the diorganopolysiloxane is added at levels below about 0.01 part per 100 parts by weight of (A), there is little improvement in the surface quality (i.e., sharkskin) versus the corresponding unmodified polyolefin, particularly at high rates of extrusion. Similarly, at levels higher than about 1 part of (B) per 100 parts by weight of (A), the surface quality of the extrudate again begins to deteriorate. Furthermore, when more than about 1 part of (B) per 100 parts by weight of (A) is used, an excessive amount of siloxane is observed on the surface of the extrudate which adversely impacts such properties as printability and sealability. Additionally, the physical properties of the final extrudate are degraded. Thus, the above recited preferred compositional ranges result in the desired balance of good surface quality (i.e., little sharkskin), clarity, smoothness, sealability, paintability and gloss of the extruded material as well as low screw slip during processing, particularly at high extruder output rates.

The dispersion of diorganopolysiloxane (B) into polyolefin (A) may be accomplished by any of the traditional means for mixing additives into thermoplastic resin at elevated temperature. For example, the two components may be blended in a twin-screw extruder, a Banbury mixer, a two-roll mill or a single-screw extruder, either with or without a mixing head. The equipment used to mix these component is thus not critical as long as a uniform dispersion of (B) in (A) is attained. Preferably the dispersed particle size is no larger than about 10 micrometers.

In addition to the above components, compositions of the present invention may also contain up to about 1 percent by weight of each of the following: fillers, cure agents, lubricants, u.v. stabilizers, antioxidants, antiblock agents, catalyst stabilizers and other process aids commonly employed in the modification of polyolefins. When more than about 1 weight percent of any of these additional ingredients is used, there is interference with the process aid of the present invention such that the above described benefits in processing and/or the character of the resulting extruded materials are not obtained. This is particularly critical in the case of blown film production, where good surface quality is crucial.

Specific non-limiting examples of the above additional ingredients include the following substances. Diatomaceous earth, octadecyl-3-(3,5-di-5-butyl 4-hydroxyphenyl)-propionate, bis(2-hydroxyethyl) tallowamine, calcium stearate, N,N-bis(2,2,6,6-tetramethyl-4-piperidinyl)-1,6-hexanediamine polymer with 2,4,6-trichloro-1,3,5-trizaine and 2,4,6-trichloro-1,3,5-trizaine and 2,4,4-trimethyl 1,2-pentanamine, dimethyl succinate polymer with 2,2,6,6-tetramethyl-1-piperridineethanol, 2,2-thiobis)4-tert-octylphenolato]n-butylamine nickel, tris(2,4-di-tert-butylphenyl)phoshite, bis(2,4-di-t-butylphenyl) pentaerythritol diphosphite, trisnonylphenylphospite, polyethylene glycol, Erucamide, titanium dioxide, titanium dioxide, alumina, hydrated alumina, talc, 2-hydroxy-4-n-octyloxy-benzophenone, zinc oxide, zinc sulfide and zinc stearate.

According to the method of the present invention, the above described diorganopolysiloxane (B) is added to the polyolefin resin (A) and serves as a process aid therefor when the resin is extruded at elevated temperatures to form a shaped product (e.g., a cylindrical cross-section, such as a film, ribbon, bar, annulus, fiber, sheet, or the like). The resulting extrudate has an improved surface (i.e., less sharkskin) relative to a similar extrudate which does not contain diorganopolysiloxane (B). This method is particularly applicable to the production of cast film (film casting) or blown film (film blowing), but also finds utility in extrusion blow molding; injection molding; pipe, wire, or cable extrusion; fiber production; and any similar high shear melt processing of polyolefin resins, all of these techniques being well known in the art. Briefly stated, blown film is typically produced by a "bubble" technique, wherein the polyolefin composition (i.e., the melt) is extruded through an annular die to form a film in the shape of a bubble. This bubble is withdrawn from the die at a rate greater than the rate of extrusion, while a positive air pressure is maintained within the bubble. Film produced in this manner is biaxially oriented as a result of stretching in the radial and axial directions and this orientation generally imparts improved mechanical properties to the film. Cast film is generally prepared by extruding the polyolefin through a slot die followed by cooling on one or more chill rolls.

Although it is possible to obtain a relatively uniform dispersion by injecting component (B) into the screw section of an extruder while polyolefin pellets are fed in through the hopper thereof, it is preferred to first thoroughly disperse component (B) in a portion of component (A) to form a masterbatch. This masterbatch (or concentrate), which preferably contains about 1 to 50, more preferably 2.5 to 25, weight percent of the diorganopolysiloxane, may be ground up or pelletized, the resulting particulate dry-blended with additional polyolefin (the matrix) and this blend then extruded to form a composition of the invention. Use of this masterbatch technique results in a more uniform dispersion of the diorganopolysiloxane in the polyolefin matrix.

The polyolefin used in the preparation of the above described masterbatch may be the same as, or different from, the matrix polyolefin resin. Preferably, the two are of the same general type (e.g., polyethylene in the masterbatch and as the matrix). However, in highly preferred embodiments of the compositions and method of the present invention wherein the matrix polyolefin is a linear low density polyethylene (LLDPE), it has been found that the further addition of low density polyethylene (LDPE) results in even less sharkskin as well as reduced "screw slip" relative to compositions wherein only the diorganopolysiloxane (B) is added to LLDPE. As known to those skilled in the art, output (e.g., length/unit time or mass/unit time) is approximately proportional to the rotational screw speed (revolutions/unit time) at low extrusion rates. However, at higher screw speeds, there is a deviation from this proportionality, the difference being termed "screw slip." These three-component systems result in a greater output under identical extruder conditions relative to the above described two-component systems of the invention.

Thus, highly preferred compositions of the invention comprise 100 parts by weight of a linear low density polyethylene, 0.01 to 1 part by weight of diorganopolysiloxane (B) and about 0.01 to 10 parts by weight of a low density polyethylene (C). Below about 0.01 part of LDPE per 100 parts by weight of LLDPE the three-component composition can not generally be distinguished over the above described systems comprising only components (A) and (B). Above about 10 parts of LDPE per 100 parts by weight of LLDPE the ultimate physical properties of the LLDPE are compromised. In these preferred embodiments, a favorable proportion is about 0.1 to 5 parts by weight of LDPE (C) for each 100 parts by weight of LLDPE (A), while the preferred diorganopolysiloxane (B) content is as described supra.

For the purposes of the present invention, the LDPE may be any of the highly branched PE homopolymers having a number average molecular weight up to about 4,000,000 and a density of about 0.915 to 0.925 g/cc.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 25° C., unless indicated to the contrary.

MATERIALS

The following materials were employed in the examples.

LLDPE1a=a linear, low density polyethylene; an octene-based copolymer of ethylene having a density of 0.917 g/cc and marketed under the trade name DOWLEX™ 2047A by the Dow Chemical Co., Midland, Mich. (LOT 1155943).

LLDPE1b=same as LLDPE1a (LOT 1051743).

LLDPE1c=same as LLDPE1a (LOT 671043).

LLDPE2=a linear, low density polyethylene; an octene-based copolymer of ethylene having a density of 0.923 g/cc and marketed under the trade name NEO-ZEX™ 2015M by Mitsui-Sekiyu Kagaku Kogyo, Japan.

LLDPE3=a linear, low density polyethylene; a hexene-based copolymer of ethylene having a density of 0.918 g/cc and marketed under the trade name NOVACOR™ TF-0119-F by Novacor (Calgary, Alberta; Canada).

LDPE1=a low density polyethylene having a density of 0.923 g/cc and marketed as DOW™ GP-LDPE 5004IM by the Dow Chemical Co.

LDPE2=a low density polyethylene having a density of 0.925 g/cc and marketed as SUMIKATHENE™ G401 by the Sumitomo Chemical Co., Japan.

PDMS1=a linear dimethylhydroxysiloxy-terminated polydimethylsiloxane oil having a number average molecular weight (Mn) of 38,730 by gel permeation chromatography (GPC).

PDMS2=a linear polydimethylsiloxane oil having a number average molecular weight of 52,950 by GPC, wherein 1 mole percent (M%) of the terminal units are trimethylsiloxy and 99 mole percent of the terminal units are dimethylhydroxysiloxy.

PDMS3a=a linear dimethylhydroxysiloxy-terminated polydimethylsiloxane gum having a number average molecular weight of 249,800 by GPC.

PDMS3b=a linear dimethylhydroxysiloxy-terminated polydimethylsiloxane gum having a number average molecular weight of 265,100 by GPC.

PDMS5=a linear dimethylhydroxysiloxy-terminated polydimethylsiloxane gum having a number average molecular weight of 340,200 by GPC and containing about 7 weight percent dimethylcyclopolysiloxanes.

PDMS6=a linear polydimethylsiloxane oil having a number average molecular weight of 51,240 by GPC, wherein 92 mole percent of the terminal units are trimethylsiloxy and 8 mole percent of the terminal units are dimethylhydroxysiloxy.

PDMS7=a linear polydimethylsiloxane gum having a number average molecular weight of 306,600 by GPC, wherein 43 mole percent of the terminal units are trimethylsiloxy and 57 mole percent of the terminal units are dimethylhydroxysiloxy.

PDMS8=a linear polydimethylsiloxane gum having a number average molecular weight of 318,500 by GPC, wherein 80 mole percent of the terminal units are dimethylvinylsiloxy and 20 mole percent of the terminal units are dimethylhydroxysiloxy.

PDMS9=a linear polydimethylsiloxane gum having a number average molecular weight of about 340,000, wherein 51 mole percent of the terminal units are dimethylvinylsiloxy and 49 mole percent of the terminal units are dimethylhydroxysiloxy.

MASTERBATCHES

Masterbatches of the above described siloxanes in the above described polyethylenes (PE) were prepared by thoroughly mixing these components at elevated temperature. The particular components and their proportions in the masterbatches are summarized in Table 1. Masterbatches (MB) were prepared on a Haake Rheocord™ 90 system twin-screw extruder (Haake—Paramus, N.J.), equipped with a TW 100 extruder having two counter-rotating intensive-mixing screws having a 1.225-inch rear diameter, 0.775-inch front diameter, and a length of approximately 13-inches. Temperatures of the four zones of the extruder were set at 170° C., 185° C., 185° C., and 185° C., respectively. In each case, the masterbatch composition was extruded through a strand die and chopped into pellets upon cooling.

TABLE 1

| Process Aid | Silicone | % Silicone | PE | % PE |
| --- | --- | --- | --- | --- |
| Masterbatch 1 | PDMS1 | 6 | LLDPE1a | 94 |
| Masterbatch 2 | PDMS2 | 6 | LLDPE1a | 94 |
| Masterbatch 3 | PDMS3a | 5 | LLDPE1a | 95 |
| Masterbatch 4 | PDMS3b | 25 | LDPE1 | 75 |
| Masterbatch 5 | PDMS5 | 5 | LLDPE1a | 95 |
| Masterbatch 6 | PDMS6 | 5 | LLDPE1a | 95 |
| Masterbatch 7 | PDMS7 | 50 | LDPE2 | 50 |
| Masterbatch 8 | PDMS8 | 5 | LDPE1 | 95 |
| Masterbatch 9 | PDMS8 | 5 | LLDPE1a | 95 |
| Masterbatch 10 | PDMS9 | 5 | LLDPE2 | 95 |

EVALUATION OF THE MASTERBATCHES

Each of the above masterbatches (ME) was employed as a process aid for polyethylene by thoroughly dispersing it in a LLDPE1a matrix (with the exceptions of Examples 4 and 6 which employed LLDPE1b and LLDPE1c, respectively, as the matrix). The amount of masterbatch used was calculated so as to give a total silicone concentration of about 440 parts per million (ppm) by weight in the mixture. These compositions are summarized in Table 2. In a typical mixing procedure (Example 7), 8 grams of Masterbatch 7 pellets were added to 20 lbs. (9,072 g) of LLDPE1a pellets and the combination shaken to yield a pre-mix containing about 440 ppm of PDMS7. This pre-mix was extruded at various extruder speeds (revolutions per minute=RPM). The extruder used was a Davis-Standard DS-20 single-screw extruder, equipped with a ribbon die (0.04 inch×1.0 inch= 1.02 mm×25.4 mm), 2-inch (50.8 mm) diameter screw (3:1 compression ratio) and 24/1 length/diameter ratio. The ribbon die was fabricated from P-20 alloy steel. Zones 1, 2 and 3 of the extruder were set at 340° F. (171° C.), 365° F. (185° C.) and 365° F. (185° C.), respectively, whereas the flange and die temperatures were set at 350° F. (177° C.) for extruding LLDPE1a, LLDPE1b and LLDPE1c. During the extrusion, extruder amperage (i.e., power consumption), pressure near the die and extrudate output (in feet/minute) were recorded as a function of extruder speed (revolutions per minute=RPM) (Run 1).

The extrudate from the above Run 1 was then granulated and re-extruded as a function of extruder speed at the above noted conditions (Run 2). Extruder amperage, pressure, and extrudate output were again recorded at each speed.

Samples of extruded ribbon were obtained at various extruder speeds for evaluation of surface roughness. At an extruder speed of 20 RPM, a 20 foot-long ribbon sample was taken and cut into 20 1-foot sections. Surface roughness measurements were performed on each 1-foot section and an averaged surface roughness determined. This process was repeated at a speed of 40 RPM. The average surface roughness values $R_a$ (in microinches) are reported in Table 2.

Surface roughness was determined with a Mitutoyo Surftest 402 surface roughness tester. Briefly, this test comprised dragging a diamond-tipped stylus, coupled to a variable reluctance transducer, over the top surface of the extruded sample (in the longitudinal or extrusion direction). Each stroke was about 3 mm long and the mean height of the irregularities was obtained.

For comparison purposes, unmodified PE controls using only virgin LLDPE1a, LLDPE1b and LLDPE1c were evaluated for surface roughness and these results are also shown in Table 2 (Controls 1–3, respectively).

TABLE 2

| Example/Masterbatch | PDMS Endgroup | PDMS Mn | Masterbatch PE Type | Surface Roughness (Microinches) 20 RPM | 40 RPM |
| --- | --- | --- | --- | --- | --- |
| Control 1 = LLDPE1a | — | — | — | 622.6 | 642.4 |
| Control 2 = LLDPE1b | — | — | — | 629.1 | 785.9 |
| Control 3 = LLDPE1a | — | — | — | 664 | 756 |
| Example 1/MB 1 | OH (100 M%) | 38730 | LLDPE1a | 1.1 | 20 |
| Example 2/MB 2 | OH (99 M%)/Me$_3$ (1 M%) | 52950 | LLDPE1a | 1.3 | 34 |
| Example 3/MB 3 | OH (100 M%) | 249800 | LLDPE1a | 1.5 | 84.2 |
| Example 4/MB 4 | OH (100 M%) | 265100 | LDPE1 | 0.5* | 2* |
| Example 5/MB 5 | OH (100 M%) | 340200 | LLDPE1a | 2.5 | 82.3 |
| Example 6/MB 6 | OH (8 M%)/Me$_3$ (92 M%) | 51240 | LLDPE1a | 417.4** | 698.8** |
| Example 7/MB 7 | OH (57 M%)/Me$_3$ (43 M%) | 306600 | LDPE2 | 226.1 | 396.2 |
| Example 8/MB 8 | OH (20 M%)/Me$_2$Vi (80 M%) | 318500 | LDPE1 | 43.6 | 542.0 |
| Example 9/MB 9 | OH (20 M%)/Me$_2$Vi (80 M%) | 318500 | LLDPE1a | 158.4 | 554.2 |
| Example 10/MB 10 | OH (49 M%)/Me$_2$Vi (51 M%) | 340000 | LLDPE2 | 106.9 | 379.1 |

*Evaluated in LLDPE1b instead of LLDPE1a matrix.
**Evaluated in LLDPE1c instead of LLDPE1a matrix.

As an added comparison, LDPE1 was used by itself as the process aid in LLDPE1a at a level of 1,321 ppm. The corresponding surface roughness values at 20 and 40 RPM were 577.3 and 619.6 microinches, respectively.

Although it is apparent that all of the siloxane-containing compositions showed some reduction in surface roughness relative to pure LLDPE controls, several points may be gleaned from the above data.

First, when the polydimethylsiloxane molecular weight is relatively constant (i.e., about 39,000 to 53,000) there is a dramatic reduction of surface roughness for extrusions wherein the siloxane component has hydroxyl end groups (Example 1) versus the case wherein the siloxanes have trimethylsiloxy end groups (Example 6). This is also seen for siloxane molecular weights in the range 320,000 to 340,000 from the comparison of Example 5 with Example 10 and Example 9.

Second, when the end groups on the siloxane component are essentially all dimethylhydroxysiloxy, the surface roughness is inversely related to molecular weight (Examples 1, 2, 3 and 5 wherein Mn is about 39,000, 53,000, 250,000 and 340,000, respectively).

Third, although modification of LLDPE1a with only LDPE1 had little effect on surface roughness relative to the controls of pure LLDPE1, the inclusion of both a hydroxy-terminated siloxane gum (440 ppm) and LDPE1 (1,320 ppm) in the LLDPE1a matrix (Example 4) resulted in a dramatically reduced roughness, particularly at 40 RPM, versus the composition wherein an essentially identical siloxane was dispersed in a LLDPE1a matrix (Example 3). This benefit of incorporating the LDPE was observed, albeit in less dramatic fashion, in the compositions wherein only a fraction of the siloxane end groups were hydroxyl. Thus, Example 9 containing only 440 ppm of PMDS8 had an average roughness of 158.4 microinches at 20 RPM while Example 8 containing 440 ppm of PMDS8 and 8,360 ppm of LDPE1 had a roughness of only 43.6 microinches at the same speed.

The above procedures were repeated using LLDPE3 as the matrix PE wherein 440 ppm of siloxane was introduced (Examples 11 and 12). In this case, the extruder settings for Run 1 and Run 2 were: zones 1, 2 and 3=370° F. (188° C.), 390° F. (199° C.) and 400° F. (204° C.), respectively; flange and die temperatures=400° F. (204° C.). Table 3 summarizes these compositions and roughness results.

TABLE 3

| Example/Masterbatch | PDMS Endgroup | MB PE Type | Averaged Surface Roughness (Microinches) | |
|---|---|---|---|---|
| | | | 20 RPM | 40 RPM |
| Control 4 = LLDPE3 | — | — | 109.5 | 684.5 |
| Example 11/MB 4 | OH (100 M %) | LDPE1 | 1.7 | 69.4 |
| Example 12/MB 7 | OH (57 M %)/Me$_3$ (43 M%) | LDPE2 | 26.4 | 250.7 |

It is again seen that LDPE, in combination with the hydroxy-terminated terminated polydimethylsiloxane gum imparted the lowest roughness values for the LLDPE3 matrix.

The effect of siloxane (PDMS3b) content on surface roughness was evaluated using Masterbatch 4 in LLDPE1c matrix. These compositions were processed at the same conditions as were Examples 1–10, supra, the results being presented in Table 4.

TABLE 4

| Example | Siloxane Concentration (ppm PDMS3b) | Averaged Surface Roughness (Microinches) | |
|---|---|---|---|
| | | 20 RPM | 40 RPM |
| Control 3 (LLDPE1c) | 0 | 664 | 756 |
| Example 13 | 55 | 610 | 710 |
| Example 14 | 110 | 428 | 571 |
| Example 15 | 220 | 196 | 411 |
| Example 16 | 440 | 13 | 147 |
| Example 17 | 880 | 1.4 | 4.8 |
| Example 18 | 1760 | 7.1 | 3.2 |

TABLE 4-continued

| Example | Siloxane Concentration (ppm PDMS3b) | Averaged Surface Roughness (Microinches) | |
|---|---|---|---|
| | | 20 RPM | 40 RPM |
| Example 19 | 3520 | 60 | 14.1 |
| Example 20 | 10014 | 228 | 94 |

The results from Run 1 of previous examples were compared with the results from Run 2 (i.e., material extruded a second time). The maximum extrusion speed (i.e., the speed at which the maximum rated amperage of the extruder was attained) was determined for each case, these data being summarized in Table 5. In this table, the last column indicates the relative drop in maximum extrusion speed between Run 1 and Run 2 (e.g., for Example 3, the % drop=100×(60−55)/60=8%).

TABLE 5

| Process Aid | Maximum Extrusion Speed (RPM) | | % Drop in Extrusion Speed (%) |
|---|---|---|---|
| | Run 1 | Run 2 | |
| Control 1 = LLDPE1a | 55 | 55 | 0 |
| Control 2 = LLDPE1b | 55 | 55 | 0 |
| Example 1 | 100 | 55 | 45 |
| Example 2 | 75 | 55 | 27 |
| Example 3 | 60 | 55 | 8 |
| Example 4 | 70* | 65* | 7 |
| Example 5 | 60 | 55 | 8 |

*Evaluated using LLDPE1b instead of LLDPE1a matrix.

From Table 5 it can be seen that compositions employing low molecular weight polydimethylsiloxane oil (Examples 1 and 2) show a considerable decrease of maximum possible extrusion rate between Runs 1 and 2 relative to systems which employ the higher molecular weight gums (Examples 3 and 5). This limits the practical utility of compositions containing low molecular weight siloxane oil relative to gum since a diminished reprocessing capability is associated with the former systems.

The extruder output rate (in feet per minute) of Example 4 (Run 2) was compared with the corresponding rate of Example 3 (Run 2) as a function or extruder speed (in RPM), the results being shown in Table 6.

TABLE 6

| Extruder Speed (RPM) | Output Rate (Feet/Minute) | |
|---|---|---|
| | Example 3 | Example 4 |
| 10 | 10 | 9 |
| 15 | 12 | 14 |
| 20 | 16 | 17 |
| 25 | 21 | 17 |
| 30 | 26 | 26 |
| 35 | 30 | 31 |
| 40 | 35 | 35 |
| 45 | 37 | 37 |
| 50 | 40 | 46 |
| 55 | 40 | 50 |
| 60 | * | 54 |
| 65 | * | 60 |

* Beyond maximum extruder power capability.

From Table 6 it can be seen that the addition of LDPE1 to LLDPE1a matrix (Example 4) containing 440 ppm of a hydroxy-terminated polydimethylsiloxane gum of approximately equal molecular weight (Example 3) resulted in significantly improved output rate at the higher extruder speeds. This difference between the output rate and the extruder speed is attributable to greater screw slippage. This table also shows that the extruder capacity (i.e., maximum amperage) was exceeded below a speed of 60 RPM in the case of Example 3, whereas a speed of at least 65 RPM was possible when extruding the composition of Example 4.

As a further comparison, several commercially available process aids were evaluated in LLDPE1a matrix at a level of 440 ppm according to the procedures of Examples 1–10. The following materials were used: KYNAR™ 460=a poly (vinylidene fluoride) and is a product of Atochem (Philadelphia, Pa.).

VITON™ FREE FLOW TA=a copolymer of vinylidene fluoride and hexafluoropropylene having carboxyl end groups and Mn of about 90,000. It is a product of E.I. duPont (Wilmington, Del.).

EPOLENE™ N-34=a polyethylene wax having Mn of about 2,200 and is a product of Eastman Chemicals (Kingsport, Tenn.).

DYNAMAR™ FX5920=a blend of polyethylene oxide and a copolymer of vinylidene fluoride and hexafluoropropylene and is a product of 3 M (St. Paul, Minn.).

HUNTSMAN™ A27527=a process aid polyethylene additive concentrate and is a product of Polycom Huntsman (Washington, Pa.).

UNION CARBIDE™ PA-1=a polyoxyethylene-grafted polydimethylsiloxane and is a product of Union Carbide (Danbury, Conn.). Results of roughness tests on the above extrudates appear in Table 7.

TABLE 7

| Process Aid (440 ppm in LLDPE1a) | Averaged Surface Roughness (Microinches) | |
|---|---|---|
| | 20 RPM | 40 RPM |
| KYNAR ™ 460 | 14.3 | 283.3 |
| VITON ™ FREE FLOW TA | 5.6 | 158.2 |
| EPOLENE ™ N-34 | 68.8 | 348.5 |
| DYNAMAR ™ FX5920 | 3.0 | 257.1 |
| HUNTSMAN ™ A27527 | 8.1 | 263.8 |
| UNION CARBIDE ™ PA-1 | 18.0 | 240.2 |

It can be seen that the reduction of the surface roughness imparted by these process aids is generally less than that attained by the present invention, as illustrated by the examples above which employed the same matrix polyethylene. This is particularly true at the higher extruder speed.

A comparison composition, which incorporated a filler and a silicone "plasticizer," was prepared as follows. A uniform mixture was first prepared, said mixture consisting of 61 parts of PDMS3a, 4 parts of a hydroxyl-terminated polydimethylsiloxane having a molecular weight of about 850 and 35 parts of a fumed silica having a nominal surface area of about 250 m$^2$ per gram. This mixture was then dispersed in LLDPE1c matrix, as described above, such that the polydimethylsiloxane gum content in the combination was about 403 ppm. When this modified polyethylene was extruded (Run 2; zone 1=171° C., zones 2–3 and die=177° C.), the average surface roughness was 574 microinches at 20 RPM and 799 microinches at 40 RPM.

That which is claimed is:

1. A composition consisting essentially of:
   (A) 100 parts by weight of a polyolefin resin; and
   (B) 0.01 to 1 part by weight of a silicon-bonded hydroxyfunctional diorganopolysiloxane having a number average molecular weight of at least 40,000.

2. The composition according to claim 1, wherein said diorganopolysiloxane (B) is a linear hydroxy-terminated polydimethylsiloxane and said polyolefin (A) is a polymer or copolymer of ethylene.

3. The composition according to claim 2, wherein said polyolefin (A) is a linear low density polyethylene.

4. The composition according to claim 3, wherein the number average molecular weight of said polydimethylsiloxane (B) is 100,000 to 400,000 and from 0.02 to 0.5 part by weight of said polydimethylsiloxane is used for each 100 parts by weight of said polyethylene (A).

5. The composition according to claim 4, wherein the number average molecular weight of said polydimethylsiloxane (B) is 250,000 to 350,000 and from 0.04 to 0.2 part by weight of said polydimethylsiloxane is used for each 100 parts by weight of said polyethylene (A).

6. The composition according to claim 1, wherein said polyolefin is a polyethylene resin.

7. The composition according to claim 6, wherein said diorganopolysiloxane (B) is a polydimethylsiloxane having terminal groups selected from dimethylhydroxysiloxy, diphenylhydroxysiloxy or methylphenylhydroxysiloxy.

8. A composition comprising:
   (A) 100 parts by weight of a linear low density polyethylene resin;
   (B) 0.01 to 1 part by weight of a silicon-bonded hydroxyfunctional diorganopolysiloxane having a number average molecular weight of at least 10,000; and
   (C) 0.01 to 10 parts by weight of a low density polyethylene.

9. The composition according to claim 8, wherein said diorganopolysiloxane (B) is a linear hydroxy-terminated polydimethylsiloxane.

10. The composition according to claim 9, wherein the number average molecular weight of said polydimethylsiloxane (B) is 100,000 to 400,000 and from 0.02 to 0.5 part by weight of said polydimethylsiloxane is used for each 100 parts by weight of said linear low density polyethylene (A).

11. The composition according to claim 10, wherein the number average molecular weight of said polydimethylsiloxane (B) is 250,000 to 350,000 and from 0.04 to 0.2 part by weight of said polydimethylsiloxane is used for each 100 parts by weight of said linear low density polyethylene (A).

12. The composition according to claim 8, wherein said diorganopolysiloxane (B) is polydimethylsiloxane having terminal groups selected from dimethylhydroxysiloxy, diphenylhydroxysiloxy or methylphenylhydroxysiloxy.

13. In a method of extruding a polyolefin resin in which a process aid is added to the resin in order to facilitate processing of the resin, the improvement comprising adding 0.01 to 1 part by weight for each 100 parts by weight of said resin of a process aid consisting essentially of a siliconbonded hydroxy-functional diorganopolysiloxane having a number average molecular weight of at least 40,000, whereby the resulting extrudate exhibits a reduced degree of sharkskin relative to the unmodified polyolefin.

14. The method according to claim 13, wherein said diorganopolysiloxane is polydimethylsiloxane and said polyolefin is a polymer or copolymer of ethylene.

15. The method according to claim 14, wherein said diorganopolysiloxane is a linear hydroxy-terminated polydimethylsiloxane and said polyolefin is a linear low density polyethylene.

16. The method according to claim 15, wherein the number average molecular weight of said polydimethylsiloxane is 100,000 to 400,000 and from 0.02 to 0.5 part by weight of said polydimethylsiloxane is used for each 100 parts by weight of said polyethylene.

17. In a method of extruding a polyethylene resin in which a process aid is added to the resin in order to facilitate processing of the resin, the improvement comprising adding a process aid comprising a uniform blend of
(i) 0.01 to 1 part by weight of a hydroxy-functional diorganopolysiloxane having a number average molecular weight of at least 10,000; and
(ii) 0.01 to 10 parts by weight of a low density polyethylene to
(iii) 100 parts by weight of a linear low density polyethylene resin, whereby the resulting extrudate exhibits a reduced degree of sharkskin relative to the unmodified linear low density polyethylene.

18. The method according to claim 17, wherein said diorganopolysiloxane is a polydimethylsiloxane.

19. The method according to claim 18, wherein said diorganopolysiloxane is a linear hydroxy-terminated polydimethylsiloxane.

20. The method according to claim 19, wherein the number average molecular weight of said polydimethylsiloxane is 100,000 to 400,000, from 0.02 to 0.5 part by weight of said polydimethylsiloxane is used for each 100 parts by weight of said polyethylene and from 0.01 to 10 parts by weight of said low density polyethylene is used for each 100 parts by weight of said linear low density polyethylene.

21. The method according to claim 13, wherein the resulting extrudate is further subjected to a film blowing step.

22. The method according to claim 13, wherein the resulting extrudate is further subjected to a film casting step.

23. The method according to claim 17, wherein the resulting extrudate is further subjected to a film blowing step.

24. The method according to claim 17, wherein the resulting extrudate is further subjected to a film casting step.

25. Shaped products of the composition according to claim 1.

26. Shaped products of the composition according to claim 2.

27. Shaped products of the composition according to claim 8.

28. Shaped products of the composition according to claim 9.

* * * * *